United States Patent
Temple (10) Patent No.: US 7,818,613 B2
(45) Date of Patent: Oct. 19, 2010

(54) ARRANGEMENT AND METHOD FOR CONNECTING A PROCESSING NODE IN A DISTRIBUTION SYSTEM

(75) Inventor: Christopher Temple, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 681 days.

(21) Appl. No.: 10/567,309

(22) PCT Filed: Aug. 3, 2004

(86) PCT No.: PCT/EP2004/051700

§ 371 (c)(1),
(2), (4) Date: Jul. 13, 2006

(87) PCT Pub. No.: WO2005/015833

PCT Pub. Date: Feb. 17, 2005

(65) Prior Publication Data

US 2006/0274790 A1 Dec. 7, 2006

(30) Foreign Application Priority Data

Aug. 5, 2003 (GB) .................................. 0318256.5

(51) Int. Cl.
*G06F 11/00* (2006.01)
(52) U.S. Cl. ............................... 714/9; 714/47; 370/216
(58) Field of Classification Search ..................... 714/9, 714/47; 370/216
See application file for complete search history.

(56) References Cited

U.S. PATENT DOCUMENTS

| | | | |
|---|---|---|---|
| 5,568,615 A | 10/1996 | Sederlund et al. | |
| 5,636,204 A | 6/1997 | Mizuno et al. | |
| 7,124,316 B2 * | 10/2006 | Kopetz et al. | 714/2 |
| 7,246,186 B2 * | 7/2007 | Hall et al. | 710/124 |
| 7,583,692 B2 * | 9/2009 | Fuhrmann et al. | 370/458 |
| 7,586,953 B2 * | 9/2009 | Forest et al. | 370/503 |
| 2002/0133756 A1 | 9/2002 | Jain | |
| 2005/0129055 A1 * | 6/2005 | Hall et al. | 370/461 |
| 2005/0164699 A1 * | 7/2005 | Temple et al. | 455/424 |
| 2007/0268819 A1 * | 11/2007 | Johansson et al. | 370/216 |
| 2008/0098234 A1 * | 4/2008 | Driscoll et al. | 713/189 |

FOREIGN PATENT DOCUMENTS

| | | |
|---|---|---|
| GB | 2386804 A | 9/2003 |
| WO | 01/30028 A2 | 4/2001 |

OTHER PUBLICATIONS definition of "Time-Triggered Protocol,"retrieved from www.wikipedia.org on Jun. 24, 2009.*
Great Britain Appl. No. 0318256.5 Search Report dated Nov. 20, 2003.

* cited by examiner

*Primary Examiner*—Philip Guyton

(57) ABSTRACT

An arrangement and method for interconnecting fail-uncontrolled processor nodes in a dependable distributed system. A node has a bus guardian with input switches which act in combination with a logic element as an input multiplexer under the control of a control unit.

This provides the advantage of transferring the problem of fault containment from the output interface of a potentially faulty processing node to the input interface of fault-free processing nodes. By doing so, problems encountered by spatial proximity faults or functional dependencies within a faulty processing node that may jeopardize fault containment at its output interface are mitigated.

12 Claims, 7 Drawing Sheets

ARRANGEMENT AND METHOD FOR CONNECTING A PROCESSING NODE IN A DISTRIBUTION SYSTEM

FIELD OF THE INVENTION

This invention relates to distributed systems and particularly (though not exclusively) to hard real-time systems using static TDMA (Time Division Multiple Access) based medium arbitration that should remain operational even if subjected to the arbitrary failure of a single processing node.

BACKGROUND OF THE INVENTION

In the field of this invention it is known that in a distributed processing system having a plurality of nodes, while a processing node can fail in an arbitrary way, it is necessary to assure that a single faulty fail-uncontrolled processing node does not disrupt communication among fault-free processing nodes. In order to achieve this objective it is known to use either
- (a) a fully connected network topology, or
- (b) a multi-drop transmission line topology, or
- (c) a star topology containing an intelligent central distribution unit, or
- (d) a multi-access topology with an 'anti-jabbering' unit in the form of a bus guardian at the outgoing network interface of each processing node.

However, these approaches have the disadvantages that:
- (a) a fully connected network topology involves high cost, and an unfeasible network structure;
- (b) a multi-drop transmission line topology requires a receiver for every multi-drop transmission channel;
- (c) a star topology containing an intelligent central distribution unit requires high complexity in the distribution unit, increasing susceptibility to faults;
- (d) in a multi-access topology with an 'anti-jabbering' unit in the form of a bus guardian at the outgoing network interface of each processing node, the bus guardian is susceptible to spatial proximity faults, and potential functional dependency between the bus guardian and the communication unit within the processing node.

A need therefore exists for a scheme for interconnecting processing nodes in a distributed system wherein the above-mentioned disadvantages may be alleviated.

STATEMENT OF INVENTION

In accordance with a first aspect of the present invention there is provided an arrangement for connecting a node in a distributed system as claimed in claim 1.

In accordance with a second aspect of the present invention there is provided a method of operating a node in a distributed system as claimed in claim 11.

BRIEF DESCRIPTION OF THE DRAWINGS

Various methods and arrangements for interconnecting fail-uncontrolled processors in a dependable distributed system incorporating the present invention will now be described, by way of example only, with reference to the accompanying drawings, in which.

DESCRIPTION OF PREFERRED EMBODIMENTS

Figure 1:
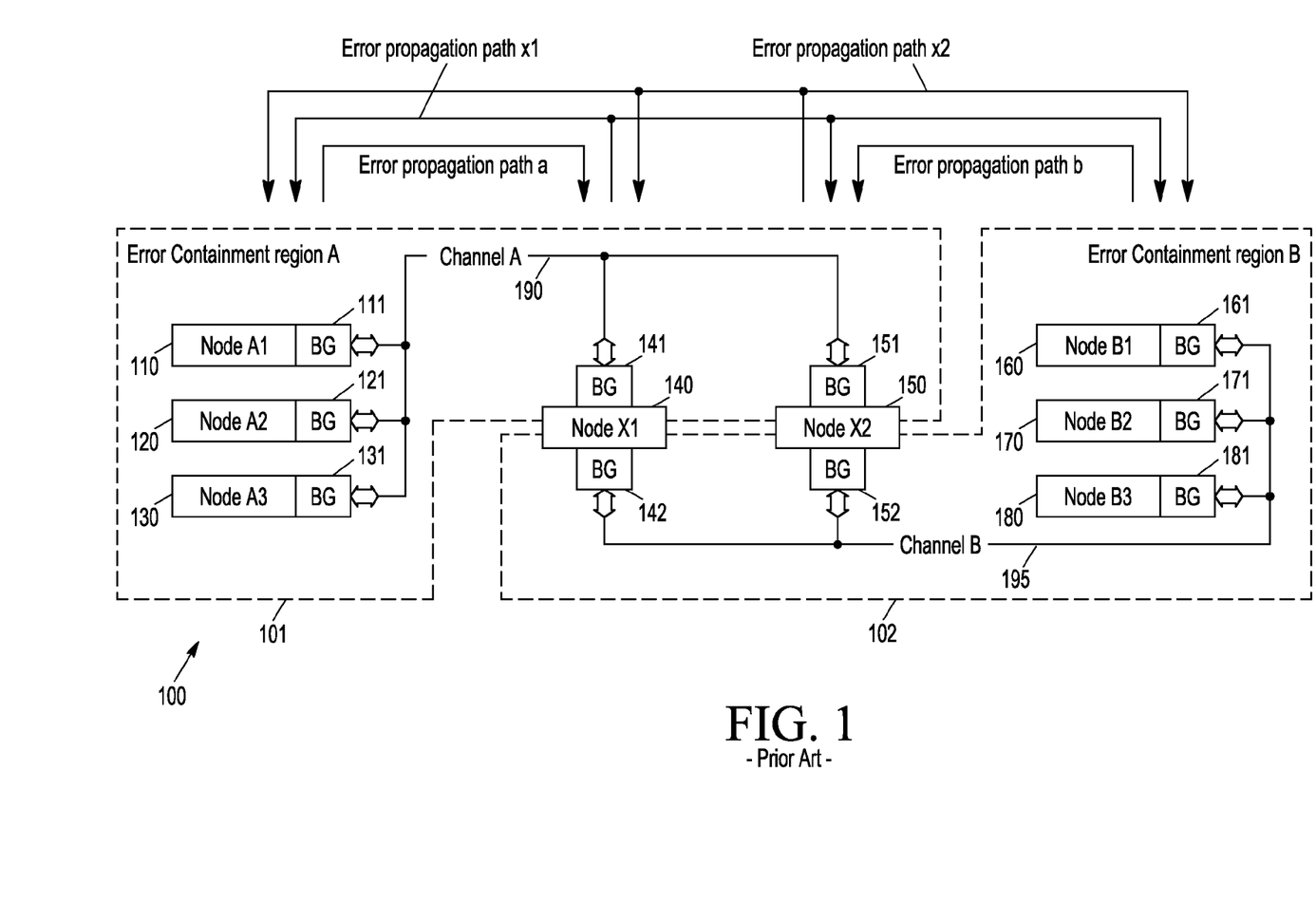
FIG. 1 shows a block schematic illustration of a known bus guardian based distributed processing system.

Referring firstly to FIG. 1, a known bus guardian based distributed processing TTP/C™ (Time Triggered Protocol class C) network system 100 includes nodes 110, 120, 130, 140, 150, 160, 170, 180; each of the nodes has a bus guardian BG 111, 121, 131, 141, 151, 161, 171, 181. The nodes 110, 120 and 130 are coupled via a common channel 190 to the nodes 140 and 150, and constitute an error containment region 101. The nodes 160, 170 and 180 are coupled via a common channel 195 to the nodes 140 and 150, and constitute an error containment region 102. Babbling idiot faults occurring in nodes 110, 120 or 130 act on 140 and 150 (depicted by fault propagation path a) but not on nodes 160, 170 and 180, while faults occurring in nodes 160, 170 or 180 act on 140 and 150 (depicted by fault propagation path b) but not on nodes 110, 120 and 130. Faults in 140 or 150 (fault propagation path x1 and x2), however, act on both error containment regions, i.e., nodes 110, 120, 130, 160, 170 and 180 including nodes 140 and 150.

The invention allows the problem of protecting a computational node in a distributed system against 'babbling idiot' failures (when a faulty node continually broadcasts a message, which takes over the bus) to be solved by equipping each node with a 'node guardian'. The structure of such a node guardian is shown in FIG. 2.

Figure 2:
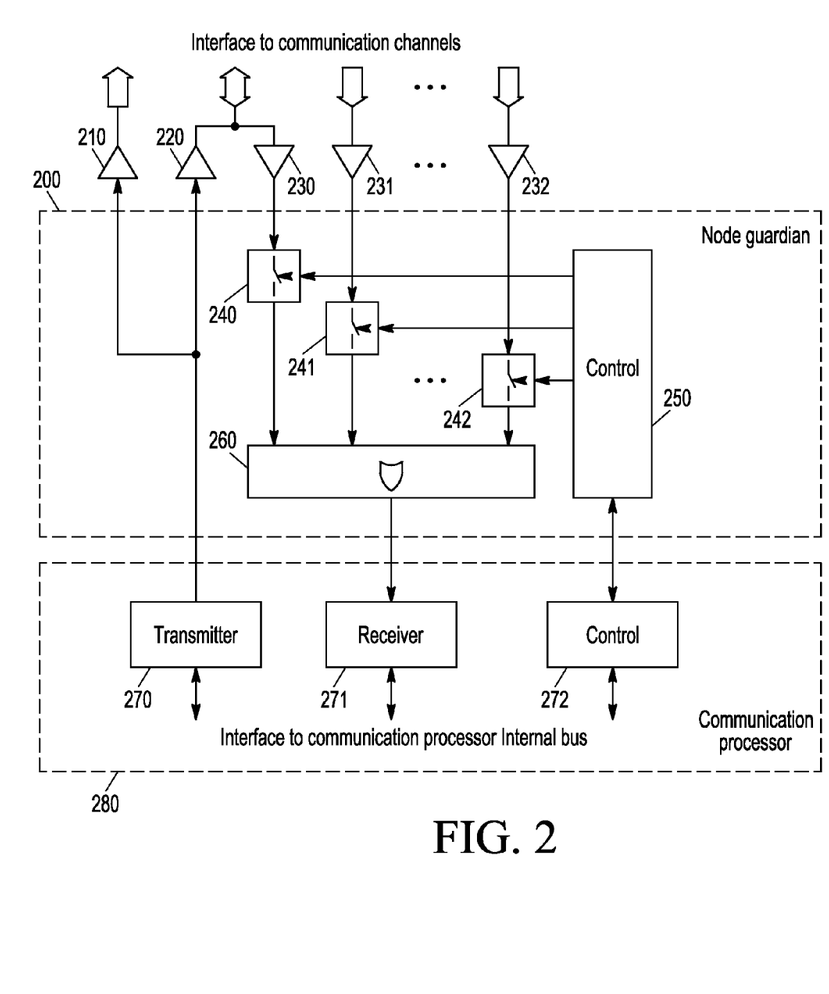
FIG. 2 shows a block schematic illustration of a node guardian arrangement which may be used in the present invention.

The node guardian 200 consists of a set of switches (FIG. 2 shows an example of three, namely: 240, 241, 242) that connect input signals from a set of bus drivers 230, 231, 232 to a receiver 271 of the communication processor 280 via a logical-OR operation 260 and a control unit 250 that interoperates with the communication processor 280 via a control unit 272 and controls the state of each respective switch 240, 241, 242. It will be appreciated that input switches 240, 241, 242 combined with a logic element 260 act as an in input multiplexer under the control of the control unit 250.

It will be understood that control units 272 and 250 are only separated to demonstrate conformance to the known FlexRay™ architecture, and may otherwise be commonly provided.

The node guardian 200 protects the receiver of the communication processor against jabbering nodes by enabling and disabling the respective switches according to a static TDMA schedule (which will be understood and need not be described in further detail). The node guardian 200 implements an input protection boundary, which means it may share the same clock, power supply, etc., with the communication processor 280. Another key difference compared to the bus guardian approach is that with the node guardian 280 protection occurs outside of the sphere of the faulty node and within the sphere of the fault-free device.

Figure 3:
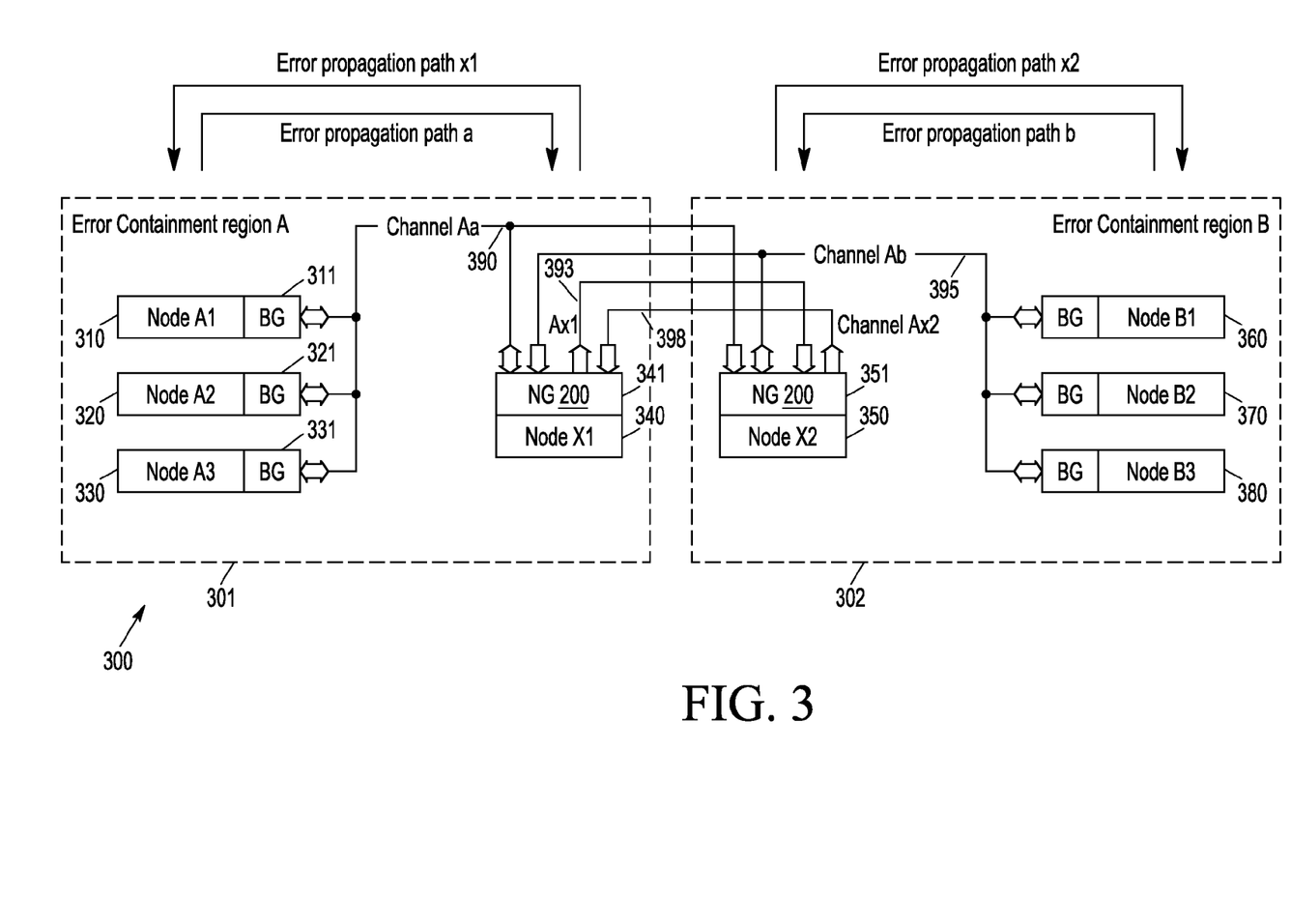
FIG. 3 shows a block schematic illustration of a distributed processing system developed from the bus guardian based system of FIG. 1 and utilising the node guardian arrangement of FIG. 2.

FIG. 3 shows an example of a hierarchical distributed processing network system system developed from the purely bus guardian based system of FIG. 1 and utilising the bus guardian arrangement 200 of FIG. 2. In the system 300 of FIG. 3, nodes 310, 320, 330, 360, 370 and 380 implement the bus guardian approach as in the system of FIG. 1, while two nodes 340 and 350 each incorporate the arrangement 200 of FIG. 2 in 341 and 351 and are based on the node guardian approach. The nodes 310, 320 and 330 are coupled via a common channel 390 to the node 340 and constitute error containment region 301, and are also coupled via the channel 390 to the node 350. The nodes 360, 370 and 380 are coupled via a common channel 395 to the node 350 and constitute an error containment region 302, and are also coupled via the channel 395 to the node 340. The node 340 is coupled to the node 350 via path 393, and the node 350 is coupled to the node 340 via path 398. Path 393 enables node 340 to communicate with node 350 even if a jabbering fault in node 310, 320 or 330 has penetrated past the respective bus guardian 311, 321 or 331 and blocked channel 390. Path 398 serves in a corresponding way for node 350. In the system of FIG. 3, a fault occurring in error containment region 301 (i.e., nodes 310, 320, 330 or 340) is confined to region 301 (fault propagation path a and x1) and cannot impact the nodes in error containment region 302. The same holds true vice versa for faults originating in error containment region 302. Hence, a clear concept of confinement is implemented.

Figure 4:
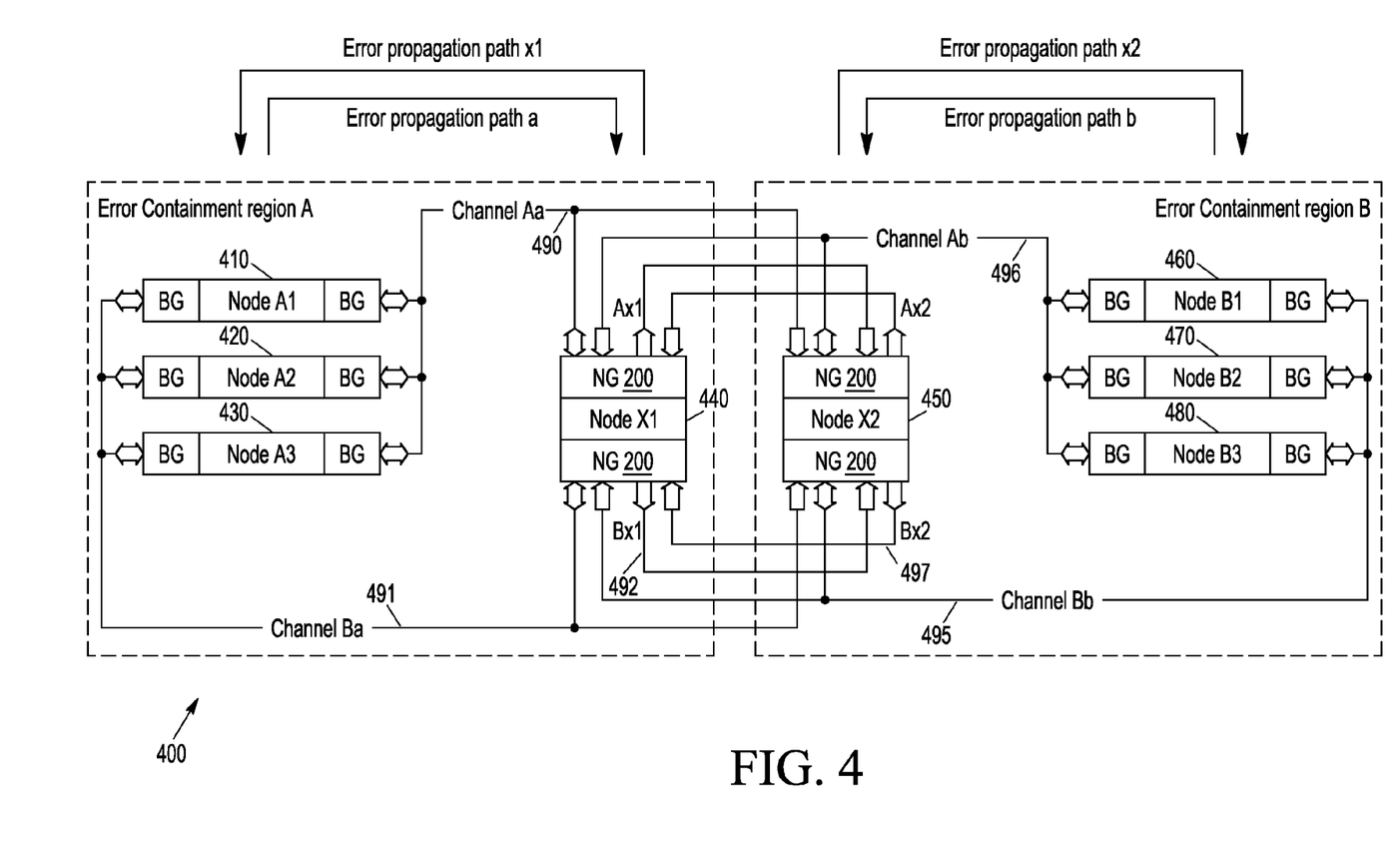
FIG. 4 shows a block schematic illustration of an improved version of the distributed processing system of FIG. 3 for making use of dual channel capabilities.

FIG. 4 shows an improved version of the example shown in FIG. 3 that makes use of the dual channel capabilities provided in particular by FlexRay™. Additionally to the FIG. 3, in the system 400 of FIG. 4 the nodes 410, 420 and 430 are coupled to the nodes 440 and 450 via a common channel 491, and the nodes 460, 470 and 480 are coupled to the nodes 440 and 450 via a common channel 495; the node 440 is coupled to the node 450 via path 492, and the node 450 is coupled to the node 440 via path 497. In the system of FIG. 4, it is possible to tolerate transient and one permanent channel failure in either fault containment region. In case of a failure of channel 490, for example, the nodes 410, 420, 430 and 440 can still communicate via channel 491. The same holds true vice versa for a channel failure in fault containment region 402.

Figure 5:
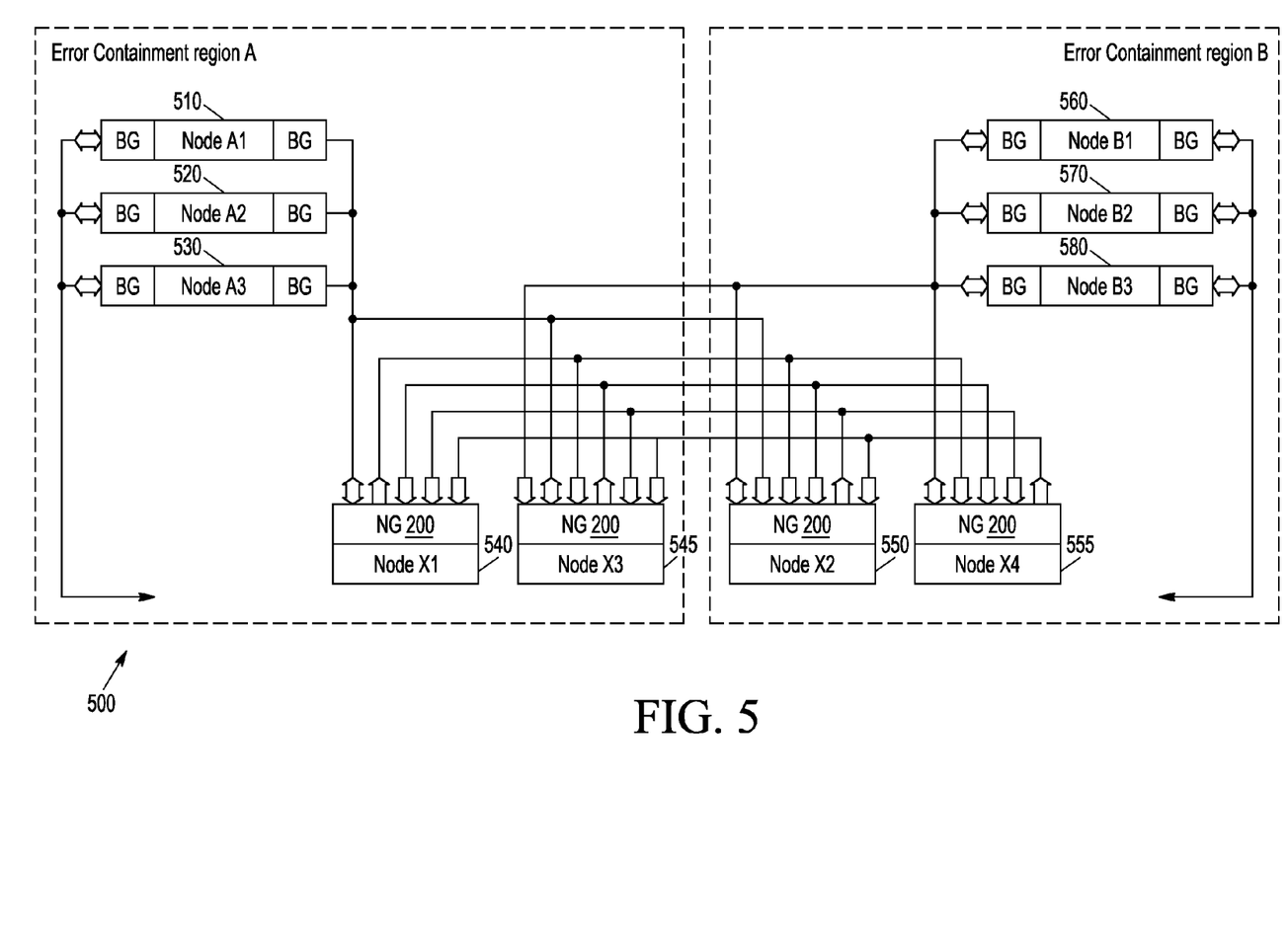
FIG. 5 shows a block schematic illustration of a distributed processing system containing four central nodes, demonstrating how the node guardian approach of FIG. 4 scales to a larger system.
Figure 6:
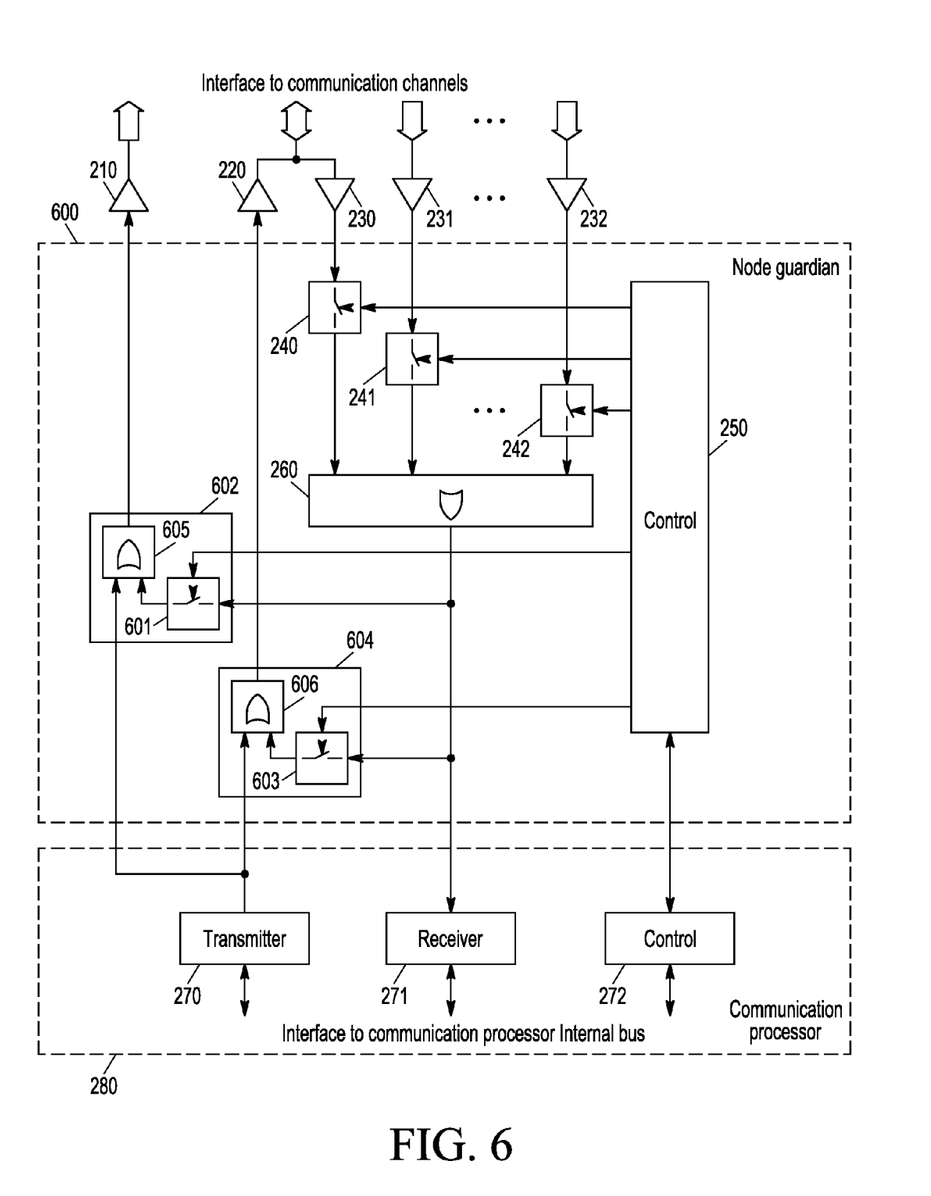
FIG. 6 shows a block schematic illustration of a node guardian arrangement which may be used in the present invention according to a second embodiment.
Figure 7:
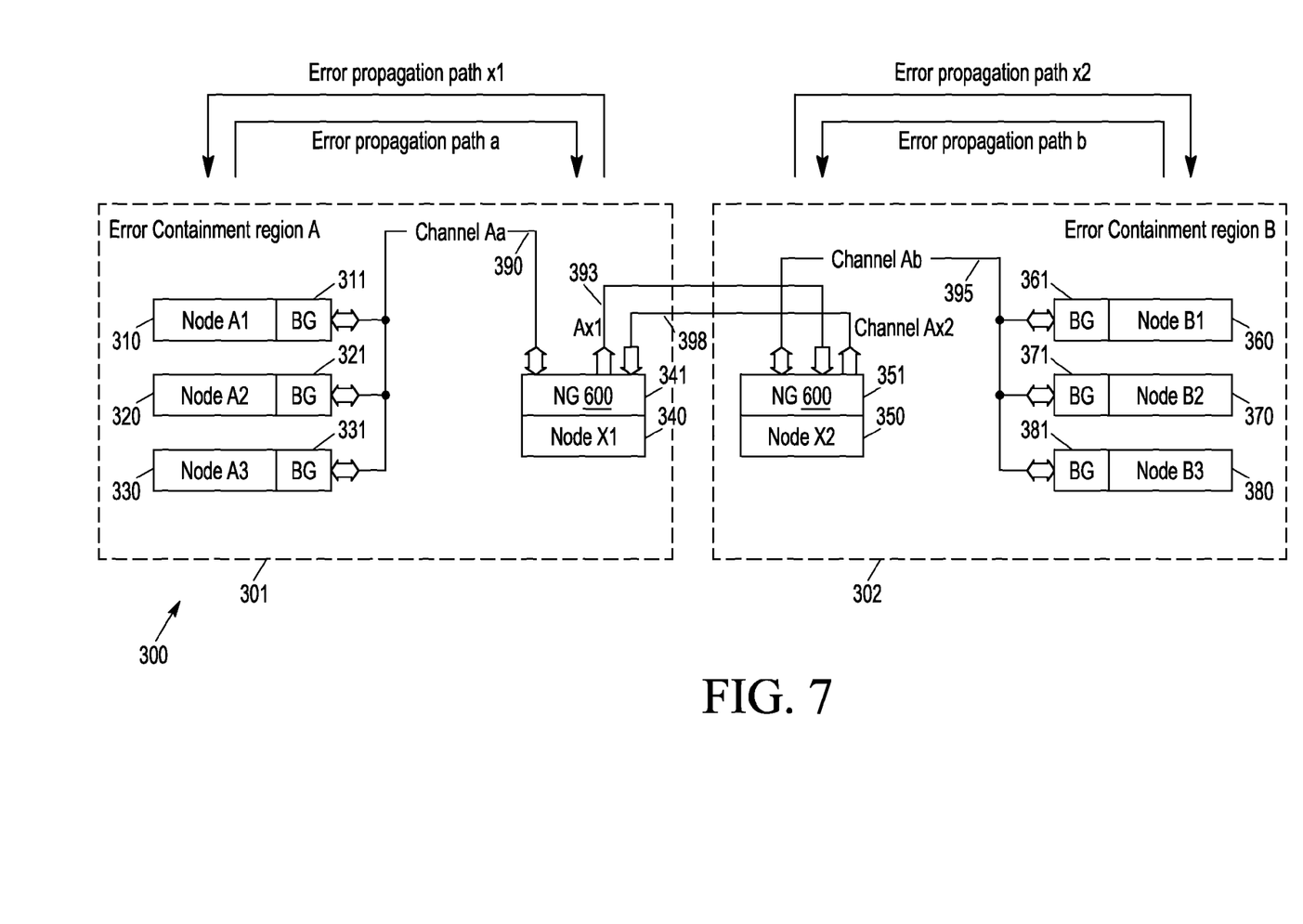
FIG. 7 shows a block schematic illustration of a distributed processing system utilising the node guardian arrangement of FIG. 6.

FIG. 5 shows how the node guardian approach (as shown, for example, in FIG. 3) scales to a large system containing four central nodes 540, 545, 550, 555 each having a node guard arrangement 200 for each channel (the figure only being completed for one channel). In the system 500 of FIG. 5, as can be seen by comparison with FIG. 3, two further central nodes 545 and 555 have been added to the nodes 540 and 550, the nodes 545 and 555 being provided in error containment regions 501 and 502 respectively, the nodes 510, 520, 530 being coupled directly to central nodes 540, 545 and 550, the nodes 560, 570, 580 being coupled directly to central nodes 540, 545 and 555, and the nodes 540, 545, 550, 555 being cross-coupled. The cross-coupling enables nodes 540, 545, 550 and 555 to maintain communication even if, for example, the channel connecting 510, 520 and 530 with 540, 545 and 550 fails.

It will be appreciated that a key benefit of the node guardian approach compared to the bus guardian approach is that it is not necessary to define an error containment boundary within the transmitting node. This eliminates many problems encountered with the bus guardian approach concerning avoiding common failure modes, such as independent clock sourcing, independent power supply, testing and test interaction.

It will be understood that the method and arrangement for interconnecting fail-uncontrolled processors in a dependable distributed system described above provides the following advantages:

The invention transfers the problem of fault containment from the output interface of a potentially faulty processing node to the input interface of fault-free processing nodes. By doing so, problems encountered by spatial proximity faults or functional dependencies within a faulty processing node that may jeopardize fault containment at its output interface are mitigated.

The invention claimed is:

1. An arrangement for connecting a node in a distributed system containing fail-uncontrolled nodes, the arrangement comprising:
   a receiver for receiving signals from another node of the system, and
   a node guardian coupled to the receiver to control selectively reception according to a predetermined TDMA schedule of a message thereat so as to reduce reception of uncontrolled transmission from another node of the system;
   wherein the node guardian comprises:
      a switch for receiving a plurality of input signals,
      logic coupled to the switch for combining the plurality of received signals according to a predetermined logic function comprising an OR logic function, and
      a controller coupled to the switch for controlling application of the plurality of received signals to the logic, the controller being arranged to control the switch according to the predetermined TDMA schedule.

2. A distributed system comprising the arrangement according to claim 1.

3. The system of claim 2, further comprising at least one node having a bus guardian.

4. The system of claim 3 wherein the system is one of A-B:
   A a TTP/C system,
   B a FlexRay™ system.

5. A method of operating a node in a fail-uncontrolled distributed system, the method comprising:
   providing a receiver receiving signals from another node of the system, and
   providing a node guardian coupled to the receiver and controlling selectively according to a predetermined TDMA schedule reception of a message thereat so as to reduce reception of uncontrolled transmission from another node of the system;
   wherein the node guardian comprises:
      a switch for receiving a plurality of input signals,
      logic coupled to the switch for combining the plurality of received signals according to a predetermined logic function comprising an OR logic function, and
      a controller coupled to the switch for controlling application of the plurality of received signals to the logic, the controller being arranged to control the switch according to the predetermined TDMA schedule.

6. A method of operating a distributed system comprising the method of operating a node according to claim 5.

7. The method of claim 6, further comprising providing at least one node having a bus guardian.

8. The method of claim 7, comprising:
operating a first node according to claim 5,
operating a second node according to claim 5,
providing a first group of nodes having respective bus guardians, and
providing a second group of nodes having respective bus guardians,
wherein the first group is coupled to the first and second nodes via a first common channel, and the second group is coupled to the first and second nodes via a second common channel, the first group and the first node forming a first error containment region, and the second group and the second node forming a second error containment region.

9. The method of claim 8, the first group further being coupled to the first and second nodes via a third common channel, and the second group further being coupled to the first and second nodes via a fourth common channel.

10. The method of claim 8 further comprising:
operating a third node according to claim 5, and
operating a fourth node according to claim 5,
wherein the third node is coupled to the first common channel, the fourth node is coupled to the second common channel, and the first, second, third and fourth nodes are cross-coupled,
the third node being in the first error containment region, and the fourth node being in the second error containment region.

11. The method of claim 7 wherein the system is one of A-B:
A a TTP system,
B a FlexRay™ system.

12. A method of operating a distributed system comprising:
operating a first node, a second node, a third node, and a fourth node, each according to a node operating method comprising:
providing a receiver receiving signals from another node of the system, and
providing a node guardian coupled to the receiver and controlling selectively according to a predetermined TDMA schedule reception of a message thereat so as to reduce reception of uncontrolled transmission from another node of the system;
providing a first group of nodes having respective bus guardians;
providing a second group of nodes having respective bus guardians, wherein the first group is coupled to the first and second nodes via a first common channel, and the second group is coupled to the first and second nodes via a second common channel;
wherein the first group and the first node form a first error containment region, and the second group and the second node form a second error containment region;
wherein the third node is coupled to the first common channel, the fourth node is coupled to the second common channel, and the first, second, third and fourth nodes are cross-coupled;
wherein the third node is in the first error containment region, and the fourth node is in the second error containment region.

* * * * *